United States Patent [19]

Stark et al.

[11] Patent Number: 5,270,547
[45] Date of Patent: Dec. 14, 1993

[54] SCINTILLATION CAMERA VALID EVENT DISCRIMINATION

[75] Inventors: Iain Stark, Dollard des Ormeaux; Abel Ferreira, Pointe-Claire, both of Canada

[73] Assignee: Independent Scintillation Imaging Systems (ISIS) Inc., Quebec, Canada

[21] Appl. No.: 879,805

[22] Filed: May 7, 1992

[51] Int. Cl.⁵ .............................................. G01T 1/161
[52] U.S. Cl. ................................ 250/369; 250/363.07
[58] Field of Search .............. 250/369, 363.07, 363.09, 250/363.01, 366

[56] References Cited

U.S. PATENT DOCUMENTS

| | | |
|---|---|---|
| 4,516,025 | 5/1985 | Yamakawa et al. |
| 4,593,198 | 6/1986 | Pang et al. |
| 4,612,443 | 9/1986 | Alcidi |
| 4,677,300 | 6/1987 | Tawil et al. |
| 4,812,656 | 3/1989 | Yamakawa et al. |
| 4,882,680 | 11/1989 | Bonnefoy-Claudet et al. |
| 4,899,054 | 2/1990 | Barford ............................ 250/369 |

*Primary Examiner*—Paul M. Dzierzynski
*Assistant Examiner*—Richard Hanig
*Attorney, Agent, or Firm*—Merchant & Gould Smith, Edell, Welter & Schmidt

[57] ABSTRACT

The discriminator comprises a summing circuit for producing a sum signal from light detectors of a scintillation camera; a slope analysis circuit for analyzing a slope of the sum signal to produce a slope analysis result indicative of a given characteristic change in the slope; a first event characteristic evaluation circuit for producing in response to the slope analysis result and the sum signal a first event characteristic signal representative of an energy of the first event; a second event characteristic evaluation circuit for producing in response to the slope analysis result and the sum signal a second event characteristic signal representative of an energy of the second event; and a validity analyzer circuit for producing a valid event indicator signal in response to the slope analysis result, the first event characteristic signal and the second event characteristic signal. A method of pulsepile discrimination is also disclosed. The valid event indicator signal can indicate the presence of simultaneous events and the number of valid events among the simultaneous events.

8 Claims, 2 Drawing Sheets

SCINTILLATION CAMERA VALID EVENT DISCRIMINATION

FIELD OF THE INVENTION

The present invention relates to a method and apparatus for discriminating sum pulses from a scintillation camera having a scintillator and a plurality of light detectors receiving scintillation event light from the scintillator in response to radiation interacting therewith, in order to determine which pulses represent a valid event, i.e. a scintillation of an intensity which results when a photon of a particular energy interacts with the scintillator. The invention relates further to valid event discrimination which is able to determine whether an event is a valid event (an invalid event results from a scattered or background photon) even under circumstances of pulse pile-up, i.e. the condition where two events occur near simultaneously and overlap.

BACKGROUND OF THE INVENTION

In scintillation cameras, images of radiation fields are formed. In the most common application, scintillation cameras are used for medical diagnostics, in which a medical patient has a small quantity of a given radioactive isotope absorbed into the tissue or tissues to be studied in order to provide an image of such tissue or tissues (planar scans or CAT scans). The nuclear camera has a front focussing screen called a collimator which can be used to allow radiation to pass therethrough without disturbance at only certain given angles. The collimator is often a slab of lead having a large number of passage holes therein. The camera then has a scintillator crystal (such as a thallium (Th) activated sodium iodide (NaI) crystal) which is inside a sealed housing of the camera. When a high energy photon interacts with the scintillator crystal, a very small flash of light is created in the scintillator crystal. An array of photomultiplier tubes (PMT's) act as light detectors of a very high sensitivity to produce electrical signals proportional to the intensity of the light event in the scintillator. The PMT's are optically coupled to the scintillator crystal. The signals from the PMT's must then be processed to determine whether or not the light event was generated by a photon of appropriate energy and what the exact position of the light event was, in order that an image computer may use all the position data points to form a distribution image of the radiation field. In medical diagnostics, this may give an image of a given organ to show any deformity in shape or absence of natural circulation therein, the patient having ingested a substance carrying a radioactive isotope which will be transported in the body to the given organ.

For the quality of the image, it is essential that the PMT's provide accurate signals which are processed to give precise position data of only those events which are valid. It is also important that such an image is formed rapidly so that the time required using the medical diagnostic scanner is reduced without needing to resort to higher concentrations of the radioactive isotopes.

Scintillation events arise from interaction with gamma photons at a very high countrate. Since only a fraction of the scintillation events represent valid events, valid event discrimination is essential for good image production. Valid events are those in which the gamma photon to be detected is emitted by the tissue to be studied in the direction of the scintillator crystal without any intermediate interaction which would result in a loss of energy and a change of direction. In order to determine whether an event is valid or not, a sum of the PMT signals is generated and analyzed in order to determine whether the event has an energy which, within tolerance, is the expected energy of the photons generated by the radiation field. With the high countrate of events taking place in the scintillator (especially when the scintillator has a relatively large surface area or aperture), the sum signal of the PMT's often has overlapping pulses resulting from near simultaneous events.

In the prior art pulse pile-up discrimination systems, it has normally been a goal to ignore those events which occur simultaneously with another event even if the peak of the event indicates that the energy of the event is a valid one. Basically, the prior art systems relate to pulse pile-up (overlapping events) rejection systems in order to eliminate erroneous position data which can arise when either a false determination of an event takes place because the event results from two simultaneous invalid events which when analyzed by the prior art valid event discrimination system can be determined to be valid, or to avoid a wrongful position calculation, given that significant signal has been received at the same time from two different points in the scintillator crystal which can sometimes confuse the position calculation computer or circuit.

In the prior art systems, elimination of near simultaneous events even if those events were valid, was beneficial in that it reduced or eliminated the chance for erroneous position determination of the valid events. It is important to note that any loss in accuracy of valid event position or the addition of event positions resulting from invalid events blur the resulting image by creating background noise. Thus, in the prior art systems, without pulse pile-up rejection, image resolution and contrast was compromised.

SUMMARY OF THE INVENTION

An object of the present invention is to provide a valid event discriminator for use with scintillation cameras in which near simultaneous events resulting in pulse pile-up from the light detectors or PMT's are discriminated in order to determine whether the near simultaneous events represent none, one or two valid events. Accordingly, the count rate of the scintillation camera is increased without compromising the resulting image quality.

According to the invention, there is provided a valid event discriminator for use with a scintillation camera having a scintillator and a plurality of light detectors receiving scintillation event light from the scintillator in response to radiation interaction therewith, the discriminator compromising: summing means for producing a sum signal from the light detectors; slope analysis means for analyzing a slope of the sum signal to produce a slope analysis result indicative of a given characteristic change in the slope; first event characteristic evaluation means for producing in response to the slope analysis result and the sum signal a first event characteristic signal representative of an energy of the first event; second event characteristic evaluation means for producing in response to the slope analysis result and the sum signal a second event characteristic signal representative of an energy of the second event; and validity analyzing means for producing a valid event indicator signal in response to the slope analysis result, the first event characteristic signal and the second event characteristic signal.

The invention also provides a valid event discrimination method in a scintillation camera having a scintillator and a plurality of light detectors receiving scintillation event light from the scintillator in response to radiation interacting therewith, the method comprising the steps of:

producing a sum signal from the light detectors;

analyzing a slope of the sum signal to produce a slope analysis result indicative of a given characteristic change in the slope;

producing a first event characteristic signal representative of an energy of the first event in response to the slope analysis result and the sum signal;

producing a second event characteristic signal representative of an energy of the second event in response to the slope analysis result and the sum; and producing a valid event indicator signal in response to the slope analysis result, the first event characteristic signal and the second event characteristic signal.

Preferably, the first and second event characteristic signals may comprise an integral sum signal of first and second event value signals respectively, generated in response to the sum signal and the slope analysis result by first event value calculating means and second event value calculating means respectively.

Also, preferably the first and second event characteristic signals may comprise pulse shape characteristic information such as rise time to peak, peak value, and maximum slope.

BRIEF DESCRIPTION OF THE DRAWINGS

The invention will be better understood by way of the following detailed description of a preferred embodiment thereof with reference to the appended drawings in which.

DETAILED DESCRIPTION OF THE PREFERRED EMBODIMENT

Figure 1:
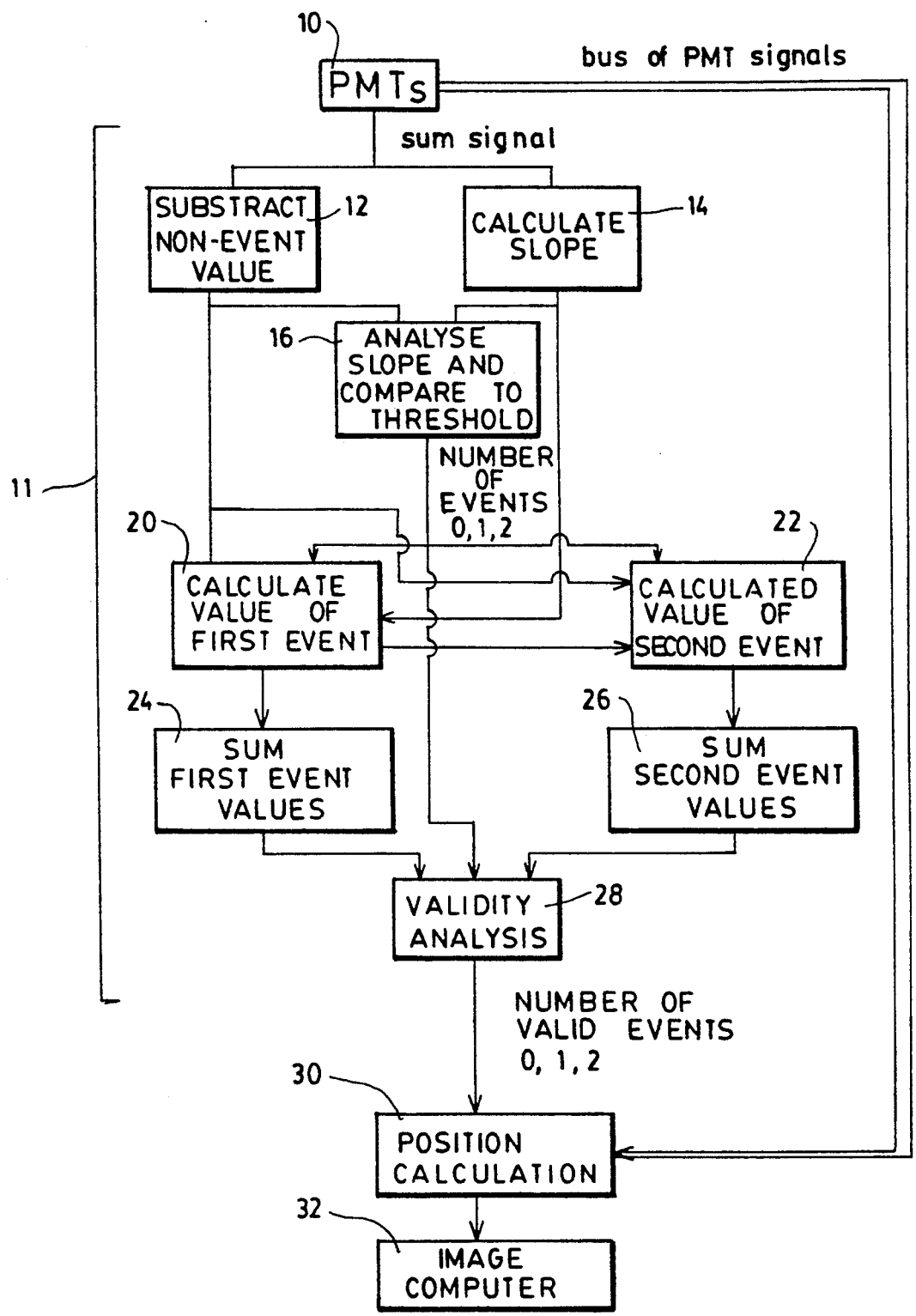
FIG. 1 is a block diagram of the valid event discriminator according to the preferred embodiment.

In the preferred embodiment shown in block form in FIG. 1, the valid event discriminator (11) for discriminating whether or not two near simultaneous events represent valid events comprises a summing connection to all photomultiplier tubes (PMTs) of scintillation camera (10), the sum signal being converted to a nine bit digital format from the analog signals generated by the PMTs. Since the signal generated from the PMTs will sometimes be small even in the absence of light in the camera (10), means (12) are provided which subtracts the non-event value of the sum signal from the digital samples of the sum signal, to generate the actual intensity signals of events. Means (12) include a register or memory for holding the non-event value and a digital subtractor for subtracting the non-event value from the sum signal. Means (14) subtract consecutive values of the digital samples to provide a slope value of the sum signal. Means (14) include a register or memory for storing the previous sum signal value and a subtractor for subtracting the sum signal from the previous sum signal stored. Means (16) carry out an analysis of the slope, the result of which is used in a particular way in the preferred embodiment, as will be described below in detail. The actual values of separated simultaneous first and second events are determined by first event calculating means (20) and second event value calculating means (22).

In the method of the preferred embodiment, the characteristic of the first and second events which is used to determine whether such events are valid or not is the energy (integral) of the events. Thus the first event characteristic evaluation means comprise first event value summing means (24), and likewise for the second event, second event value summing means (26) are provided. The results of the integration of the first and second event values are then analyzed by the validity analysis means (28), which will determine if the energy of the first and/or second event indicates that the event is a valid one. Means (28) output a valid event signal which informs the position calculation computer (30) whether no event has been detected (no processing takes place) or whether the first and/or the second event is a valid one whose position should be calculated based on the individual PMT signals from camera (10) (these individual signals may also be digitally converted once it is known that the validity analysis indicates a valid event).

The slope analysis means (16) produce a number of events output which serves to control first event value calculation means (20), second event value calculation means (22) as well as validity analysis means (28). When the nonevent value is subtracted from the sum signal by means (12), the output is also fed into the slope analysis means (16). When the event value rises above the threshold 'm', from a previous value below the threshold, the number of events output changes from zero to one, indicating that a first event is being received. At this point, the slope should be positive and slope analysis means wait for the value of the slope generated by means (14) to drop to a negative value which is above a certain quantity threshold in order to indicate that the first event is declining. At which point, if the slope analysis means detect that the event value drops below the threshold 'm', it is concluded that only one event has been received and the number of events output is reset to zero thus cuing the validity analysis means (28) to conduct its validity analysis. The threshold 'm' may be set higher for determining the start of an event and then be set to a lower value for determining the end of an event. If, however, after detecting a substantial negative slope in the first event, the slope changes sign and begins to increase substantially, the slope analysis means (16) indicate that a near-simultaneous second event is being received. At this point, the number of events output switches to two. The switching of the number of events output to two, cause event value calculation means (20) and (22) to change the manner in which they generate values.

In first event value calculation means (20), the digital values output by means (12) are fed to an adder which subtract zero therefrom so long as the number of events is one. When the number of events switches to two, the value of the first event is output to be the value of the event from means (12) from four samples prior to the point when the slope inflection is detected by slope analysis means (16) which is stored in a register whose value is switched to one of the inputs of the adder of means (20), and to the other input of the adder of means (20) is fed an inverted value of the slope from four samples prior to the slope inflection as detected by the slope analysis means (16), and the value of the register holding the event value has its value replaced with the output of the adder of means 20 with each clock cycle such that the output of means (20) begins with the value of the event from four samples prior to the slope inflection and continues to be decremented by the value of the slope (the difference between samples) from four samples prior to slope inflection until such point as the result drops below the threshold 'm', at which point a zero value is output. The number of four samples prior to slope inflection detection is merely given as an example, and the actual value will depend on the event slope and sample rate.

The second event value calculation means (22) subtract the value of the first event from the event value output by means (12) once the number of events switches from one to two. Means (22) include an adder which is given the event value as one input and an inverted value of the first event value from means (20) as another input, the other input being switched to a zero value once the first event value drops to zero, to produce an output which is fed to means (26). Means (24) and (26) each comprise an adder for summing the digital values to produce sum outputs which are fed to validity analysis means (28).

Figure 5:
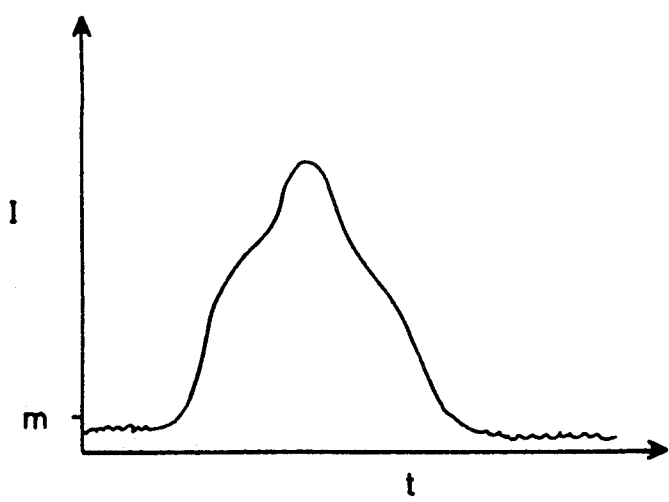
FIG. 5 shows a graph of the sum signal in which two events overlap one on top of the other.

When validity analysis means (28) detect that the number of events signal switches back to zero, thus signaling the end of the event, then digital comparators are used to verify whether the output of means (24) or (26) fall within either a first minimum and a first maximum value representing a single valid event, or a second minimum and a second maximum value representing twice the amount of energy for a valid event in the case that the sum of the first or second event values represent a simultaneous event (as in FIG. 5).

As to how the validity analysis means (28) process the integral sum signals coming from means (24) and (26), this is partly dependent on how position calculation means (30) are able to process events. It may be desirable to use discriminator (11) purely for the purposes of identifying that two events have been received near simultaneously, one of which is known to be valid (even if both are valid) in order that the position calculation means in real time can verify the validity itself of both events before passing on the position data to image computer (32). On the other hand, it may be an object to use discriminator (11) to exclude all simultaneous events or piled-up pulses which represent a mixture of valid and invalid events, and thus the number of valid events output would be determined to be zero in all cases where two events are detected only one of which contains a valid integral sum. Thus, near simultaneous events having two distinct peaks will be determined for validity to make sure that either both peaks represent valid events, and single peaks will be verified to check if they represent a simultaneous event (see FIG. 5) in which case, the number of valid events is output as being two. Many variations are possible, and if the position calculation computer (30) is capable of processing more than two events, then validity analysis means (28) can certainly pass on information that more than two valid events have been received. It may also be useful to the position calculation computer (30) whether the valid event was the first or second event.

Figure 2:
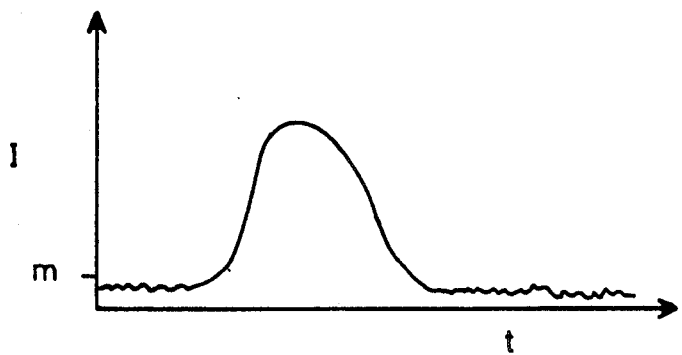
FIG. 2 is a graph of the sum signal when a single event is detected.

With reference now to FIGS. 2 to 5, the method and operation of the valid event discriminator will be described. FIG. 2 illustrates the sum signal I over time for a single event as corrected by means (12). As is shown, the event is a pulse which rises over a minimum threshold 'm' for a certain duration. As this signal is processed by discriminator (11), in the preferred embodiment, the energy of the pulse will be evaluated without regard to other characteristics, such as pulse height, rise time and maximum slope, which are equally valid characteristics which can be used to determine whether a pulse represents a valid event.

As the sum signal samples are generated (there should be a minimum sampling rate which will give at least 20 samples for a regular event pulse), the slope is calculated by means (14) and analyzed by means (16). Means (16) will determine in the case of FIG. 2 that there is only one peak (slope sign change), and thus that there is only one pulse or event to be summed by means (24). In this case, means (20) simply passes the event value signal through for summing. When the sum signal I drops below the threshold, the sum from means (24) is read by validity analysis means (28) that determines whether the energy of the single pulse is plausibly a single event (by comparison to the expected energy for a single valid event) or whether the energy corresponds to a piled-up pulse of two valid events, as shown in FIG. 5. Means (28) then outputs its determination to the position calculation computer (30).

Figure 3:
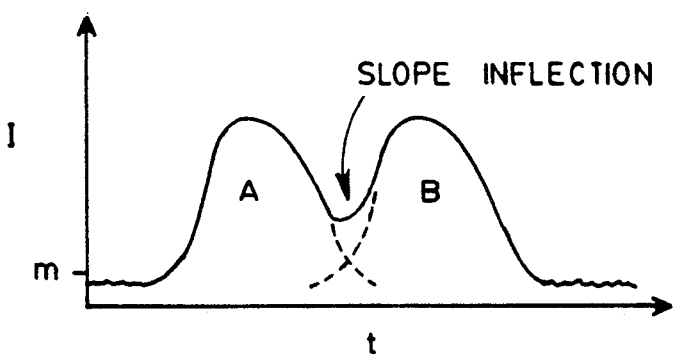
FIG. 3 is a graph of the sum signal when two events A and B overlap.
Figure 4:
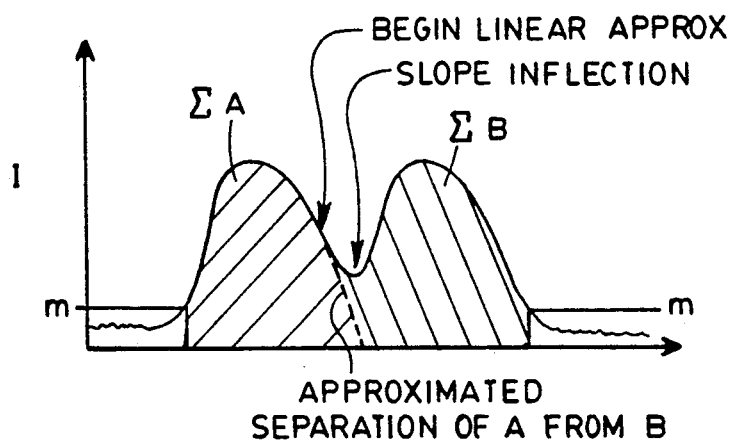
FIG. 4 shows a graph of the sum signal illustrating how the area of the piled-up pulse of FIG. 3 is divided for event discrimination according to the preferred embodiment.

In the case where two near simultaneous signals are received, as shown in FIGS. 3 and 4, the means (20) will no longer pass through the event value directly to means (24) for the duration of the whole pulse. Instead, the slope analysis means (16) detect the slope inflection that occurs between the two peaks, and at this point, means (20) begin estimating the first event values, based on a linear approximation. The slope of the event pulse before the inflection occurred is subtracted from the event value at the time when the inflection was detected to produce the first estimated first event value and thereafter repeatedly for each consecutive sample said slope is subtracted from the estimated value until it reaches zero. Meanwhile, the second event value calculating means (22) begins when the slope inflection is detected to generate values which are the difference between the event value and the estimated first event value. These calculated second event values are then passed on to the second event summing means (26). When the event value then drops below the threshold 'm', the validity analysis means (28) checks whether the integral sums generated by means (24) and (26) match the expected energy value for the photons to be detected. The discrimination result from the means (28) is then output to the position computer (30), as described above.

The preferred embodiment has been designed to provide a circuit (11) which will carry out the evaluation of the first and second events to determine validity in real time with a minimum number of components. Since the digital adder/subtractors used in the means (12), (14), and (20) though (26) can function at the sampling rate of the ADC used to convert the sum signal of the PMTs, the flow of logic control and data is easily achieved in real time.

Of course, as mentioned above, it would be possible to measure other characteristics of the event pulse, such as event pulse height, rise time and/or maximum slope, to carry out the validity analysis. These other characteristics relate in general to pulse shape which reflects the energy. Also, direct separation of the first and second event values is not necessarily required since validity can be determined based solely on the peak value or values of the piled-up pulse, along with other characteristics such as rise time and the time from the last peak to the drop below the threshold. It is to be understood that the energy of an event, being the most important characteristic, can also be derived roughly from the event's peak height, and more accurately in combination with the rise time and/or the maximum slope, instead of direct integration of the event calculated value.

Although the invention has been described above with reference to the preferred embodiment, such description is not intended to limit the scope of the present invention as defined in the appended claims.

What is claimed is:

1. A valid event discriminator for use with a scintillation camera having a scintillator and a plurality of light detectors receiving scintillation event light from the scintillator in response to radiation interaction therewith, the discriminator comprising:
    summing means for producing a sum signal from the light detectors;
    slope analysis means for analyzing a slope of the sum signal to produce a slope analysis result indicative of a given characteristic change in the slope;
    first event characteristic evaluation means for producing in response to the slope analysis result and said sum signal a first event characteristic signal representative of an energy of the first event;
    second event characteristic evaluation means for producing in response to the slope analysis result and said sum signal a second event characteristic signal representative of an energy of the second event; and
    validity analyzing means for producing a valid event indicator signal in response to the slope analysis result, the first event characteristic signal and the second event characteristic signal.

2. Discriminator as defined in claim 1, further comprising:
    first event value calculating means for producing a value of the first event based on the slope analysis result and said sum signal; and
    second event value calculating means for producing a value of the second event based on the slope analysis result and said sum signal;
    wherein said first event characteristic evaluation means sum said first event value to produce said first event characteristic signal, and said second event characteristic evaluation means sum said second event value to produce said second event characteristic signal.

3. Discriminator as defined in claim 2, wherein the first event calculating means determine the value of the first event to be the value of the sum signal until such point as the slope analysis means determine that a slope inflection occurs, and then the value of the first event is determined to be the value of the sum signal at the time when the slope inflection occurs less the product of the slope of the sum signal just before the slope inflection occurred and a time difference between the time when the slope inflection occurred and a time of the first event value, whereby the calculated value of the first event will decline linearly from the point when the slope inflection occurred until it reaches zero; and
    the second event value calculation means determine that the value of the second event is zero up until the point when the slope inflection is detected after which point the calculated value of the second event is the sum signal subtracted from the calculated value of the first event until such time as the calculated value of the first event is zero.

4. Discriminator as defined in claim 3, further comprising non event value subtraction means for subtracting from said sum signal a non event value of said sum signal in order to produce a corrected version of said sum signal.

5. A valid event discrimination method in a scintillation camera having a scintillator and a plurality of light detectors receiving scintillation event light from the scintillator in response to radiation interacting therewith, the method comprising the steps of:
    a) producing a sum signal from said light detectors;
    b) analyzing a slope of said sum signal to produce a slope analysis result indicative of a given characteristic change in said slope;
    c) producing a first event characteristic signal representative of an energy of the first event in response to said slope analysis result and said sum signal;
    d) producing a second event characteristic signal representative of an energy of the second event in response to said slope analysis result and said sum; and
    e) producing a valid event indicator signal in response to said slope analysis result, said first event characteristic signal and said second event characteristic signal.

6. Method as claimed in claim 5, further comprising before step c) steps of:
    producing a value of the first event based on the slope analysis result and said sum signal; and
    producing a value of the second event based on the slope analysis result and said sum signal;
    wherein in step c) said first event characteristic signal is produced using said first event value instead of said sum signal, and in step d) said second event characteristic is produced using said second event value instead of said sum signal.

7. Method as claimed in claim 6, wherein:
    the value of the first event is determined to be the value of the sum signal until such point as the slope analysis means determine that a slope inflection occurs, and then the value of the first event is determined to be the value of the sum signal at the time when the slope inflection occurs less the product of the slope of the sum signal just before the slope inflection occurred and a time difference between the time when the slope inflection occurred and a time of the first event value, whereby the calculated value of the first event will decline linearly from the point when the slope inflection occurred until it reaches zero; and
    the value of the second event is determined to be zero up until the point when the slope inflection is detected after which point the calculated value of the second event is the sum signal subtracted from the calculated value of the first event until such time as the calculated value of the first event is zero.

8. Method as claimed in claim 7, further comprising a step of:
    subtracting from said sum signal a non event value of said sum signal in order to produce a corrected version of said sum signal.

* * * * *